United States Patent
Hooley

(10) Patent No.: US 11,113,527 B2
(45) Date of Patent: Sep. 7, 2021

(54) AUGMENTED CODE SOLUTION

(71) Applicant: Smartglyph Limited, West Yorkshire (GB)

(72) Inventor: Martin Hooley, West Yorkshire (GB)

(73) Assignee: Smartglyph Limited, West Yorkshire (GB)

( * ) Notice: Subject to any disclaimer, the term of this patent is extended or adjusted under 35 U.S.C. 154(b) by 31 days.

(21) Appl. No.: 16/318,802

(22) PCT Filed: Jul. 18, 2017

(86) PCT No.: PCT/GB2017/052104
§ 371 (c)(1),
(2) Date: Jan. 18, 2019

(87) PCT Pub. No.: WO2018/015732
PCT Pub. Date: Jan. 25, 2018

(65) Prior Publication Data
US 2019/0244024 A1 Aug. 8, 2019

(30) Foreign Application Priority Data
Jul. 18, 2016 (GB) ..................................... 1612429

(51) Int. Cl.
*G06K 9/00* (2006.01)
*G06F 16/955* (2019.01)
*G06F 16/903* (2019.01)
*G06K 7/14* (2006.01)

(52) U.S. Cl.
CPC ... *G06K 9/00671* (2013.01); *G06F 16/90335* (2019.01); *G06F 16/9554* (2019.01); *G06K 7/1413* (2013.01); *G06K 7/1417* (2013.01)

(58) Field of Classification Search
CPC ....... G06K 19/06037; G06K 19/06028; G06K 7/10722; G06K 7/1443; G06K 19/06112; G06K 2209/27; G06K 9/46; G06K 9/72; G06K 9/00671; G06K 7/1413; G06K 7/1417; G06K 7/10544; G06F 16/9554; G06F 16/90335; G06F 16/2452
See application file for complete search history.

(56) References Cited

U.S. PATENT DOCUMENTS

| | | | |
|---|---|---|---|
| 2012/0274775 A1* | 11/2012 | Reiffel | G06Q 30/08 348/158 |
| 2014/0325328 A1 | 10/2014 | Beadles | |
| 2016/0012465 A1* | 1/2016 | Sharp | G06Q 20/384 705/14.17 |
| 2016/0063507 A1 | 3/2016 | Gao et al. | |

FOREIGN PATENT DOCUMENTS

| | | |
|---|---|---|
| WO | 0060484 A1 | 10/2000 |
| WO | 2013/112520 A1 | 8/2013 |
| WO | 2014/155115 A1 | 10/2014 |
| WO | 2015/170118 A1 | 11/2015 |

OTHER PUBLICATIONS

International Search Report and Written Opinion for corresponding Patent Application No. PCT/GB2017/052104 dated Nov. 10, 2017.

* cited by examiner

*Primary Examiner* — Diane D Mizrahi
(74) *Attorney, Agent, or Firm* — Renner, Otto, Boisselle & Sklar, LLP

(57) ABSTRACT

A system comprising a scanning device and a physical scannable element. The scannable element is optically captured by the scanning device and associated with a two-dimensional code. The two-dimensional code is then decoded and translated into a vector to identify active data stored on a server and the vector is sent to the server via a suitable network and active data is pushed to the scanning device.

13 Claims, No Drawings

AUGMENTED CODE SOLUTION

FIELD OF THE INVENTION

The invention relates to a system for scanning codes and, more particularly, to a system for augmenting scannable codes to provide enhanced information and content.

BACKGROUND TO THE INVENTION

When scanning codes, for example one-dimensional barcodes and QR (Quick Response) codes, the information returned is limited. In the case of one-dimensional barcodes, the information returned might be the barcode number and possibly product details. In the case of QR codes, the user is directed to a website or other online content. Whilst this might assist with promotional material, it is a one-way communication system with the user able to request information but the product manufacturer or seller getting little more in return.

SUMMARY OF THE INVENTION

Accordingly, the present invention is directed to a system comprising:
   a scanning device; and
   a physical scannable element;
wherein, the scannable element is optically captured by the scanning device and associated with a two-dimensional code;
   the two-dimensional code is decoded and translated into a vector to identify active data stored on a server; and
   the vector is then sent to the server via a suitable network and active data is pushed to the scanning device.

The system allows for a scannable element to be scanned by, for example, a Smartphone, and for the scanned information to be used to provide further content related to the element. Once the element has been scanned a check is performed to see whether the information in the element is associated with, or linked to, a two-dimensional code. The two-dimensional code may be an assigned unique code that is specific to the scannable element, or scannable code. Where a match is found, the two-dimensional code is decoded and in doing this a vector is provided to identify active data, for example rich media such as videos, images and documents, that are then forwarded to the scanning device. The system does not send a hyperlink to the device or direct the device to a webpage, it sends active data, files and/or rich media directly to the device. Where no scannable code is already associated with the scannable element, the system may return a message to that effect, provide standard information or other data.

The vector may be used to locate data associated with the scannable element, which is then pushed to the scanning device over a suitable network.

As the system can use existing barcodes and augments them, it can be retrospectively applied to any existing barcode and the object being scanned does not need to be changed in order to accommodate the system of the present invention.

Preferably, the scannable element is one or more of a group comprising: an alphanumeric string; a one-dimensional barcode; and an image. The code might be a linear barcode, such as a Universal Product Code (UPC), an International Article Number (IAN) or a European Article Number (EAN), which are considered to be standard barcodes, or a Code 128, serial shipping container code (SSCC), portable data file 417 or other tracking barcode.

Alternatively, the element might be an alphanumeric string, such as a vehicle number plate, text or a serial number on a product or a ticket or bank note. Employing existing codes allows one to incorporate existing elements into the system and provides an opportunity to augment existing items.

Advantageously, once the scannable element is optically captured, a database is interrogated to identify whether a two-dimensional code is associated with the element. Having look-up information in a database provides a readily updatable and easily accesses and interrogated system for checking is a two-dimensional code is associated with the element.

In one arrangement, if a two-dimensional code is not found in the database, the active data returned comprises non-active data. Where an element does not have an associated two-dimensional code, the system returns standard information to the scanning device, for example, the product details. Alternatively, it might provide some information regarding how to augment the element by employing the system of the present invention.

Where a two-dimensional code is found in the database, the active data may comprise augmented active data. Active data may be in the form of media, for example, images or videos, or it may be a document or other information. In one arrangement the image or document may be a coupon to provide the user with a discount on further purchases. Where video is employed, the video sent to the scanning device may show installation instructions or recipes for food and beverage products.

In a preferred arrangement, when the active data has been pushed to the scanning device, a bi-directional link is established between the scanning device and the server. The bi-directional link allows a user to select what active data they wish to receive. For example, scanning the element can bring up a menu from which the user can select a coupon, video or other media to be sent directly to the scanning device. In doing that, the manufacturer or seller can receive information from the user as to their interests and preferences and, where permitted, location, scanning device and buying habits.

DESCRIPTION OF EXEMPLARY EMBODIMENT

A user scans a barcode (1-dimensional or 2-dimensional) on a product and the information is forwarded to a processing unit. The processing unit is provided with access to a database of known barcodes which is then interrogated to see if the scanned barcode has augmented data prepared. Where match is discovered, the barcode is linked to a two-dimensional code, for example a code as set out in WO2014155115. More specifically, a two-dimensional code formed of an array of equal-area elements, each element being the smallest representation of a data value, wherein each element is one of the following types of element:
   a first type wherein the entire area of the element is a single colour; or
   a second type wherein the area is divided into at least two colours, each colour filling 50% of the element; and
wherein the array has a plurality of the second type of element.

Furthermore, at least one the second type of element may comprise a diagonal line running from one corner to a diagonally opposing corner or a line running from one side to an opposing side. In such an arrangement, there may be a plurality of each of the second type of elements in the code. The different colours may be black and white or other colours that are, preferably, contrasting.

Once an associated two-dimensional code has been located, the two-dimensional code is decoded in order to provide a vector. The vector points to active data on a server and the vector is sent to the server, which then pushes active information in the form of rich media to the scanning device to be displayed thereupon. The active data may be in the form of a menu from which the user may select information regarding the supplier and/or manufacturer, or where marketing material or interactive media is available. The decoding may be performed as set out in WO2014155115 (Smartglyph Limited).

In one arrangement, the scannable element is linked to a returns system for returning a product to the supplier. In such a system, a barcode is sent to the purchaser with the product (or separately if more appropriate) and, if the purchaser wishes to return the product, they scan the barcode. Once scanned a returns label is automatically generated and forwarded to the user that can identify the products to be returned. The returns label may be in the form of an image file or a document that the user can then print. This removes the need for the user to go to a website to create the label and, in turn, the supplier can be notified that the user is returning at least one item and what that item will be.

The system can be associated with a user's details and so can automatically complete information that might be requested. This allows a user to scan a warranty barcode on, for example, an electrical item, and the user's details to be sent directly to the manufacturer whilst forwarding active data in the form of a completed warranty certificate to the scanning device. Additionally, the system allows for brand engagement.

The system may be employed in relation to medical samples, for example, blood samples with the results being uploaded to a server and a medical professional scanning a barcode associated with the patient to immediately be sent the results directly to the scanning device without the need to log into a website or spend time locating the correct information.

The present invention allows the creation and delivery of augmented data, a rich media, interactive unlimited data payload delivered as a controlled push. The system of the present invention identifies the designated recipient's valid device and delivers such data payload via a closed cloud network and secure bi-directional channel.

The result of the present invention is the ability to augment any scannable alphanumeric text string or visual 2D/3D action code/barcode, to map the scannable code to an assigned unique code. The system can thus deliver the augmented data payload to a user when scanning the scannable code with a software application. Therefore, without modification to a physical representation of a scannable code, the present invention allows one to map that scannable code to a digital representation of an assigned unique 2-dimensional code which the interacts with the system to push data to the scanning device or another device.

The invention claimed is:

1. A system comprising:
a scanning device; and
a physical scannable element; and
a processor contained in the scanning device, the processor being configured to:
interrogate a database to identify a non-physical two-dimensional code that is associated with the physical scannable element subsequent to the physical scannable element being optically captured by the scanning device;
to decode the non-physical two-dimensional code and translate the non-physical two-dimensional code into a vector that identifies an active data package stored on a server;
send the vector to the server via a suitable network; and
process the active data package after having been pushed to the scanning device by the server.

2. The system according to claim 1, wherein the physical scannable element is one of a group comprising: an alphanumeric string; a one-dimensional barcode; and an image.

3. The system according to claim 1, wherein the active data package comprises augmented active data.

4. The system according to claim 1, wherein the processor is configured to establish a bi-directional link between the scanning device and the server upon the active data package being pushed to the scanning device.

5. The system according to claim 1, wherein the non-physical two-dimensional code is formed of an array of equal-area elements, each element being the smallest representation of a data value, wherein each element is one of the following types of element:
a first type wherein the entire area of the element is a single colour; or
a second type wherein the area is divided into at least two colours, each colour filling 50% of the element; and
wherein the array has a plurality of the second type of element.

6. The system of claim 1, wherein the user's details are obtained from the scanning device and sent to the server and the bi-directional link is established upon the scanning device being identified as a valid device.

7. The system of claim 1, wherein the system operates without the use of a web browser.

8. The system of claim 7, wherein the system does not send a hyperlink to the device or direct the device to a webpage, it sends the data package directly to the scanning device.

9. A method comprising:
receiving from a scanning device information associated with a physical scannable element that has been optically captured by the scanning device;
associating the information received from the scanning device with a two-dimensional code;
decoding and translating the two-dimensional code into a vector to identify an active data package stored on a server;
then sending the vector to the server via a suitable network and pushing the active data package to the scanning device; and
processing the active data package using a processor contained in the scanning device.

10. The method according to claim 9, wherein the physical scannable element is one of a group comprising: an alphanumeric string; a one-dimensional barcode; and an image.

11. The method according to claim 9, wherein the active data package comprises augmented active data.

12. The method according to claim 9, further comprising establishing a bi-directional link between the scanning device and the server when the active data package has been pushed to the scanning device.

13. The method according to claim 9, wherein the two-dimensional code is formed of an array of equal-area elements, each element being the smallest representation of a data value, wherein each element is one of the following types of elements:
- a first type wherein the entire area of the element is a single colour; or
- a second type wherein the area is divided into at least two colours, each colour filling 50% of the element; and
- wherein the array has a plurality of the second type of element.

* * * * *